United States Patent
Agawa (10) Patent No.: US 8,867,036 B2
(45) Date of Patent: Oct. 21, 2014

(54) LASER LIGHT DEFLECTION AMOUNT DETECTING APPARATUS, DISPLACEMENT MEASURING APPARATUS, METHOD FOR MANUFACTURING MOLD FOR MOLDING OPTICAL ELEMENT, AND OPTICAL ELEMENT

(75) Inventor: Teppei Agawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/543,002

(22) Filed: Jul. 6, 2012

(65) Prior Publication Data

US 2013/0023399 A1     Jan. 24, 2013

(30) Foreign Application Priority Data

Jul. 20, 2011   (JP) .................. 2011-159246

(51) Int. Cl.
  *G01J 4/00*       (2006.01)
  *B23Q 17/24*      (2006.01)
  *G01B 11/26*      (2006.01)
  *G01B 11/00*      (2006.01)

(52) U.S. Cl.
  CPC ............ *B23Q 17/2428* (2013.01); *G01B 11/26* (2013.01); *G01B 11/002* (2013.01)
  USPC ....................................................... 356/364

(58) Field of Classification Search
  USPC ..................... 356/152.2, 364, 365; 250/306
  See application file for complete search history.

(56) References Cited

U.S. PATENT DOCUMENTS

| | | | | |
|---|---|---|---|---|
| 3,623,814 A | * | 11/1971 | Buhrer | ......................... 356/365 |
| 6,642,517 B1 | * | 11/2003 | Ghislain et al. | ............... 250/306 |
| 2004/0027561 A1 | * | 2/2004 | Takahashi et al. | ......... 356/152.2 |

FOREIGN PATENT DOCUMENTS

| | | |
|---|---|---|
| CN | 101261139 B | 7/2010 |
| JP | 6-60404 A | 3/1994 |
| JP | 11144274 A | 5/1999 |
| JP | 2001004343 A | 1/2001 |

* cited by examiner

*Primary Examiner* — Tarifur Chowdhury
*Assistant Examiner* — Jamil Ahmed
(74) *Attorney, Agent, or Firm* — Fitzpatrick, Cella, Harper & Scinto (57) ABSTRACT

A laser light deflection amount detecting apparatus detects an amount of deflection of laser light and includes a laser light source, a first polarizing beam splitter that splits the laser light emitted by the laser light source, an optical system that rotates at least one of linearly polarized components around an optical axis orthogonally and that acquires a combined light of the linearly polarized components at least one of which is rotated, a light blocking member, a second polarizing beam splitter, and two light receiving elements that measure an amount of light of the polarized components resulting from the splitting by the second polarizing beam splitter.

6 Claims, 5 Drawing Sheets

LASER LIGHT DEFLECTION AMOUNT DETECTING APPARATUS, DISPLACEMENT MEASURING APPARATUS, METHOD FOR MANUFACTURING MOLD FOR MOLDING OPTICAL ELEMENT, AND OPTICAL ELEMENT

BACKGROUND OF THE INVENTION

1. Field of the Invention

The present invention relates to a laser light deflection amount detecting apparatus that detects the amount of deflection of laser light in two directions orthogonal to the optical axis of the laser light, a displacement measuring apparatus including the laser light deflection amount detecting apparatus, a method for manufacturing a mold for molding an optical element, and an optical element.

2. Description of the Related Art

Machining by means of a machine tool requires information on the positions of tools on the machine tool and on the shapes of cutting edges of the tools. One method for acquiring, by measurement, the information on the positions of the tools and the shapes of the cutting edges of the tools is to acquire tool information (the positions of the cutting edges and the shapes of the cutting edges) on the machine tool in a noncontact manner by irradiating the tools with laser light and measuring the amount of light having passed the tools without being blocked by the tools. This measurement method eliminates the need for dummy processing otherwise required to acquire the tool information by measurement. This advantageously increases throughput by an amount corresponding to a time required for the dummy processing and prevents the tools from being worn away during the dummy processing. However, the displacement measurement method of measuring the amount of light having passed a measurement target without being blocked by the measurement target may suffer deflection of the optical axis of laser light, leading to a measurement error.

Thus, a quadrisected four photo diode is conventionally used to measure the amount of deflection of laser light in two directions orthogonal to the optical axis of the laser light in order to correct the deflection of the optical axis of the laser light (Japanese Patent Application Laid-Open No. H06-60404). The quadrisected photo diode includes four light receiving elements. The amounts of light received by the respective elements are referred to as A, B, C, and D. The amount of deflection of the optical axis in one of the two directions is determined based on the result of the calculation of A+B−(C+D). The amount of deflection of the optical axis in the other direction is determined based on the result of the calculation of A+D−(B+C).

However, the method of measuring the deflection of the optical axis using the quadrisected photo diode is limited in resolution by the number of pixels in the quadrisected photo diode. The method thus has difficulty accurately measuring the deflection of the optical axis of laser light. That is, the amount of deflection in each of the two directions is determined by addition and subtraction of the results of light reception carried out by the four light receiving elements. Thus, errors in the measurement by the four light receiving elements are accumulated in the determined amounts of deflection. Consequently, accurately measuring the amounts of deflection of the laser light in the two directions is difficult.

Thus, an object of the present invention is to provide a laser light deflection amount detecting apparatus that can accurately detect the amount of deflection of the optical axis of laser light in two directions orthogonal to the laser light, a displacement measuring apparatus including the laser light deflection amount detecting apparatus, a method for manufacturing a mold for molding an optical element, and an optical element.

SUMMARY OF THE INVENTION

The present invention provides a laser light deflection amount detecting apparatus that detects an amount of deflection of laser light emitted by a laser light source, in two directions orthogonal to each other and also orthogonal to an optical axis of the laser light, the laser light deflection amount detecting apparatus including a first polarizing beam splitter that splits the laser light emitted by the laser light source into a first linearly polarized component and a second linearly polarized component having a polarization direction orthogonal to a polarization direction of the first linearly polarized component, an optical system that rotates at least one of the first linearly polarized component and the second linearly polarized component around an optical axis in such a manner that a deflection direction of the first linearly polarized component is orthogonal to a deflection direction of the second linearly polarized component, the optical system allowing the first linearly polarized component and the second linearly polarized component to overlap each other while the polarization direction of the first linearly polarized component is orthogonal to the polarization direction of the second linearly polarized component, a light blocking member including a tip formed to extend in a direction parallel to the deflection direction of one of the two optical components that are contained in a combined light acquired by the optical system and have the respective orthogonal deflection directions, the tip being arranged to block a part of the combined light, a second polarizing beam splitter that splits passing light having passed the light blocking member without being blocked by the light blocking member, into the first linearly polarized component and the second linearly polarized component, a first light receiving element that measures an amount of light of the first linearly polarized component resulting from the splitting by the second polarizing beam splitter, a second light receiving element that measures an amount of light of the second linearly polarized component resulting from the splitting by the second polarizing beam splitter, and a calculating unit that determines an amount of deflection in one of the two directions based on the amount of light measured by the first light receiving element, while determining an amount of deflection in the other of the two directions based on the amount of light measured by the second light receiving element.

According to the present invention, the amount of light of the first linearly polarized component resulting from the splitting by the second polarizing beam splitter varies depending on the deflection of the optical axis in one of the two orthogonal directions. Furthermore, the amount of light of the second linearly polarized component resulting from the splitting by the second polarizing beam splitter varies depending on the deflection of the optical axis in the other of the two orthogonal directions. Thus, the amount of deflection in each of the two directions can be determined based on the results of the measurement by the separate light receiving elements. Therefore, the amount of deflection of laser light in the two directions can be accurately measured.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[First Embodiment]

Figure 1:
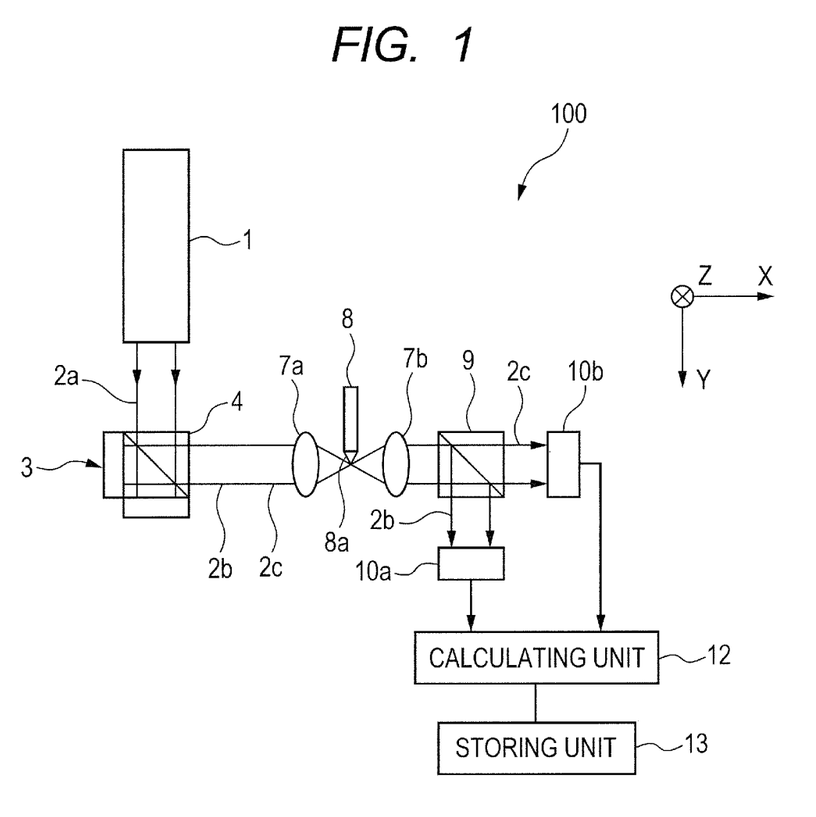
FIG. 1 is a diagram illustrating a general configuration of a laser light deflection amount detecting apparatus according to a first exemplary embodiment of the present invention.

FIG. 1 is a diagram illustrating a general configuration of a laser light deflection amount detecting apparatus according to a first exemplary embodiment of the present invention. A laser light deflection amount detecting apparatus 100 illustrated in FIG. 1 detects the amount of deflection of laser light 2a emitted by a laser light source 1, in two directions (an X axis direction and a Z axis direction in FIG. 1) orthogonal to each other and also orthogonal to the optical axis (a Y axis in FIG. 1) of the laser light 2a.

That is, the angle of the laser light 2a emitted by the laser light source 1 may vary depending on the pointing stability of the laser light source (laser head) 1, and the laser light 2a may be deflected on an optical path before reaching a target, due to atmospheric disturbance in the optical path. Thus, the laser light deflection amount detecting apparatus 100 detects the amount of deflection of the laser light 2a in the two directions. Here, the deflection of the laser light in the two directions refers to misalignment and vibration of the laser light in the two directions. In the first exemplary embodiment, a direction in which the laser light source 1 emits the laser light 2a refers to the Y axis direction. The two directions orthogonal to the Y axis refer to the X axis direction and the Z axis direction.

The laser light deflection amount detecting apparatus 100 generally includes a first polarizing beam splitter 4, an optical system 3, a focusing lens 7a, light blocking member 8, a focusing lens 7b, a second polarizing beam splitter 9, a first light receiving element 10a, and a second light receiving element 10b. Furthermore, the laser light deflection amount detecting apparatus 100 includes a calculating unit 12 and a storing unit 13. The laser light 2a emitted by the laser light source 1 travels in a+Y axis direction and enters the first polarizing beam splitter 4 arranged downstream of the laser light source 1.

The first polarizing beam splitter 4 splits the incident laser light 2a into a first linearly polarized component 2b and a second linearly polarized component 2c orthogonal to the first linearly polarized component 2b.

The description of the first exemplary embodiment assumes that the first linearly polarized component 2b is a linearly polarized component (that is, s polarization) reflected by the first polarizing beam splitter 4 and that the second linearly polarized component 2c is a linearly polarized component (that is, p polarization) transmitted through the first polarizing beam splitter 4. The first polarizing beam splitter 4 reflects the first linearly polarized component 2b of the incident laser light 2a, while allowing the second linearly polarized component 2c of the incident laser light 2a to pass through. In this case, the first linearly polarized component 2b is reflected by the first polarizing beam splitter 4 at a right angle in a+X axis direction. The first linearly polarized component 2b reflected by the first polarizing beam splitter 4 is s polarization. Furthermore, the second linearly polarized component 2c is transmitted through the first polarizing beam splitter 4 in a+Y axis direction.

The optical system 3 rotates at least one of the first linearly polarized component 2b and the second linearly polarized component 2c around the optical axis so that the deflection direction of the first linearly polarized component 2b is orthogonal to that of the second linearly polarized component 2c. The optical system 3 then allows the first linearly polarized component 2b and the second linearly polarized component 2c to overlap each other with the deflection direction of the first linearly polarized component 2b orthogonal to the deflection direction of the second linearly polarized component 2c. Here, the overlapping of the first linearly polarized component 2b and the second linearly polarized component 2c means that the optical axis of the first linearly polarized component 2b coincides with that of the second linearly polarized component 2c with the laser light 2a prevented from being deflected.

Figure 2:
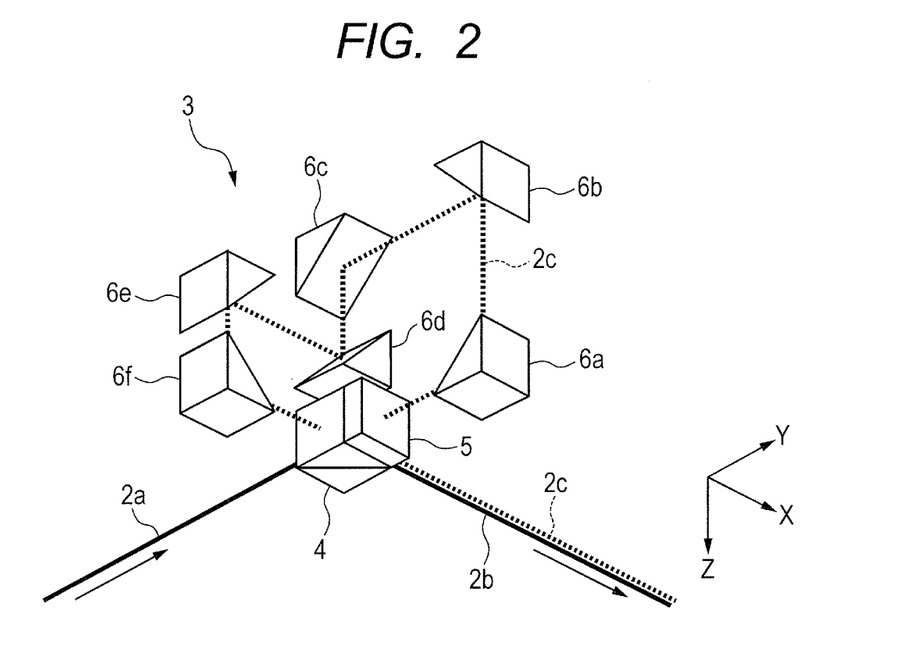
FIG. 2 is a perspective view illustrating an optical system for the laser light deflection amount detecting apparatus according to the first exemplary embodiment of the present invention.

A configuration of the optical system 3 according to the first exemplary embodiment will be described below in detail. FIG. 2 is a perspective view illustrating the optical system 3. The optical system 3 includes a half-wavelength plate (hereinafter referred to as a "½λ plate") 5 serving as a polarization section that rotates the polarization direction of the second linearly polarized component 2c through 90 degrees, and six mirrors (bender mirrors) 6a to 6f that are six reflecting members.

The mirrors 6a to 6f allow the second linearly polarized component 2c having passed through the polarizing beam splitter 4 to enter the polarizing beam splitter 4 in the same direction as that in which the first linearly polarized component 2b is reflected by the polarizing beam splitter 4. At this time, the mirrors 6a to 6f rotate the deflection direction of the second linearly polarized component 2c through 90 degrees around the optical axis of the first linearly polarized component 2b. Specifically, the mirrors 6a to 6f rotate the laser light 2c having passed through the polarizing beam splitter 4 and traveled in a+Y axis direction, through 90 degrees with respect to the laser light 2b by sequentially reflecting the laser light 2c in a−Z axis direction, a−Y axis direction, a+Z axis direction, a−X axis direction, a+Z axis direction, and a+X axis direction in this order.

In this case, immediately after passing through the polarizing beam splitter 4, the laser light 2c is p polarization with a polarization direction in which the laser light can pass through a polarization film. Thereafter, the mirrors 6a to 6f rotate the laser light 2c through 90 degrees in the direction in which the laser light 2c is deflected by the time immediately before the laser light 2c passes through the polarizing beam splitter 4. However, the polarization direction is also rotated through 90 degrees. That is, the second linearly polarized component 2c also has its polarization direction rotated through 90 degrees by passing through the mirrors 6a to 6f.

Unless the laser light 2c enters the polarizing beam splitter 4 in the same direction as that in which the laser light 2c has passed through the polarizing beam splitter 4 the first time, the laser light 2c cannot pass through the polarizing beam splitter 4 the second time. Consequently, the laser light 2c needs to be rotated through 90 degrees only in the polarization direction so as to recover the initial polarization direction. Thus, the ½λ plate 5 is arranged in the optical path of the second linearly polarized component 2c which is formed of the polarizing beam splitter 4 and the plurality of mirrors 6a to 6f.

The optical system 3 that rotates the polarization direction of the laser light 2c by 90 degrees can be easily configured by arranging the ½λ plate 5 on the optical path of the laser light 2c as described above. In this case, the ½λ plate 5 can be located anywhere on the optical path of the laser light 2c in the optical system 3 provided that the ½λ plate 5 is arranged so as to rotate the polarization direction of the laser light 2c through 90 degrees. In the first exemplary embodiment, the ½λ plate 5 is arranged between the polarizing beam splitter 4 and the mirror 6a. This converts the second linearly polarized component 2c entering the polarizing beam splitter 4 again into p polarization. Then, the second linearly polarized component 2c with the p polarization having traveled through the mirrors 6a to 6f and the ½λ plate 5, passes through the polarizing beam splitter 4 in the +X axis direction. The second linearly polarized component 2c then overlaps the first linearly polarized component 2b reflected by the polarizing beam splitter 4 and traveling in the +X axis direction. The laser light formed of the first linearly polarized component 2b and second linearly polarized component 2c overlapping each other is hereinafter referred to as combined light.

The combined light (laser light 2b and laser light 2c) is focused by the focusing lens 7a illustrated in FIG. 1. The light blocking member 8 is arranged downstream of the focusing lens 7a at a position where the light is focused by the focusing lens 7a. In other words, the focusing lens 7a focuses the combined light on a position where the light blocking member 8 is arranged. Furthermore, the light blocking member 8 may be formed to be thinner toward a tip 8a in a thickness direction (X axis direction). This is because the tip 8a thus formed can be easily aligned with the focal position of the focusing lens 7a.

Figure 3A:
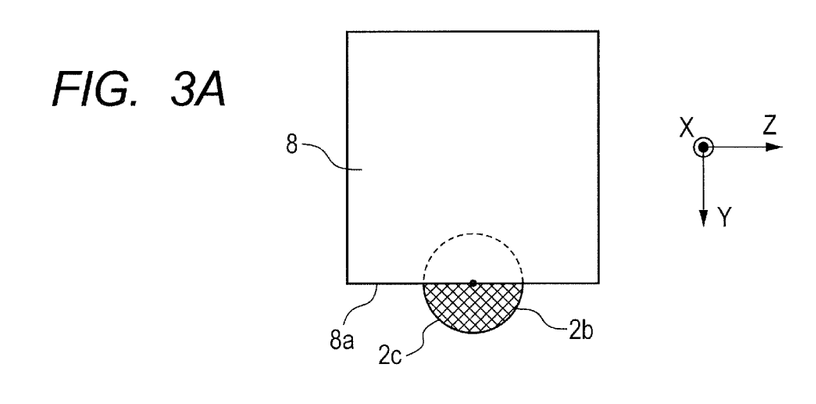
FIG. 3A is a diagram of a light blocking member as viewed from a direction parallel to an X axis direction wherein laser light emitted by a laser light source is prevented from being deflected.
Figure 3B:
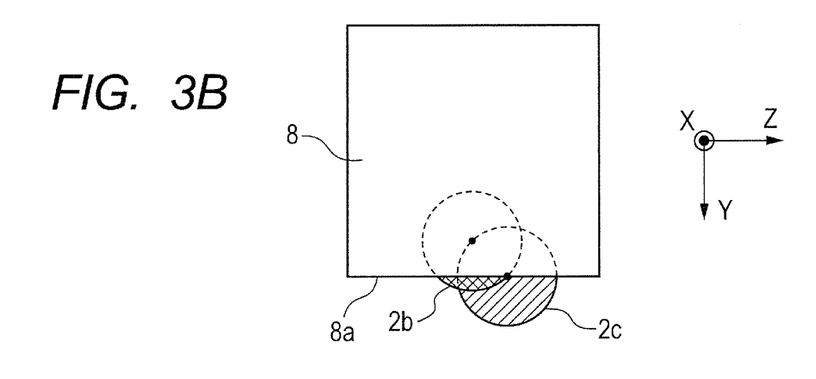
FIG. 3B is a diagram of the light blocking member as viewed from the direction parallel to the X axis direction wherein the laser light emitted by the laser light source is deflected in the X axis direction.
Figure 3C:
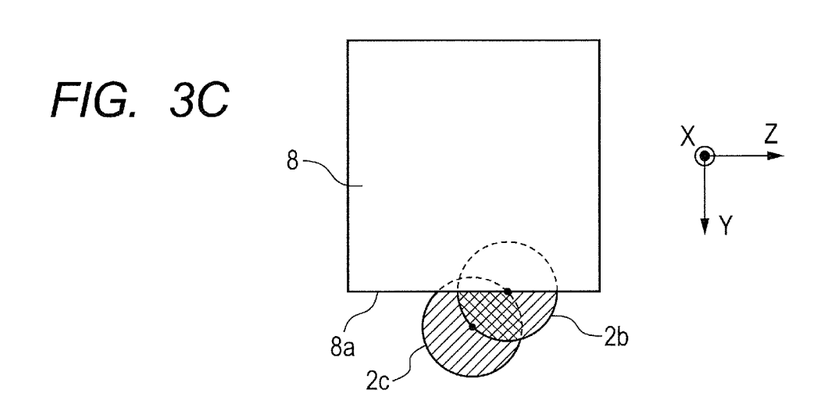
FIG. 3C is a diagram of the light blocking member as viewed from the direction parallel to the X axis direction wherein the laser light emitted by the laser light source is deflected to a Z axis direction.

FIGS. 3A to 3C are diagrams of the light blocking member 8 as viewed from a direction parallel to the X axis direction. FIG. 3A illustrates a state in which the laser light 2a emitted by the laser light source 1 is prevented from being deflected. FIG. 3B illustrates a state in which the laser light 2a emitted by the laser light source 1 is deflected in the X axis direction. FIG. 3C illustrates a state in which the laser light 2a emitted by the laser light source 1 is deflected in the Z axis direction.

The light blocking member 8 includes the linearly formed tip 8a. The tip 8a is formed to extend in a direction parallel to the deflection direction of one of two optical components contained in the combined light acquired by the optical system 3 and traveling in the respective deflection directions orthogonal to each other (the Y axis direction and the Z axis direction) (the one deflection direction is the Z axis direction according to the first exemplary embodiment, though the deflection direction may be the Y axis direction). The light blocking member 8 is arranged such that the tip 8a projects into the combined light (laser light 2b and laser light 2c) focused by the focusing lens 7a, to block a part of the combined light while the laser light 2a emitted by the laser light source 1 is prevented from being deflected. In the first exemplary embodiment, as illustrated in FIG. 3A, the light blocking member 8 is arranged so as to block a half of the combined light (the laser light 2b and the laser light 2c) while the laser light 2a emitted by the laser light source 1 is prevented from being deflected.

As illustrated in FIG. 1, the focusing lens 7b is arranged downstream of the light blocking member 8. The focusing lens 7b converts the passing light (the laser light 2b and the laser light 2c) focused on the position of the light blocking member 8 and extended as a result of the passage through the light blocking member 8, into parallel light.

The passing light (the laser light 2b and the laser light 2c) that is now the parallel light is guided to the second polarizing beam splitter 9. The second polarizing beam splitter 9 splits light having passed the light blocking member 8 without being blocked by the light blocking member 8 into the first linearly polarized component 2b and the second linearly polarized component 2c. In this case, according to the first exemplary embodiment, the first linearly polarized component 2b is s polarization, and the second linearly polarized component 2c is p polarization. Thus, the first linearly polarized component 2b is reflected by the second polarizing beam splitter 9 at a right angle and received by the first light receiving element 10a. Furthermore, the second linearly polarized component 2c passes through the second polarizing beam splitter 9, travels in a straight line, and is then received by the second light receiving element 10b.

The first light receiving element 10a can measure the amount of light of the first linearly polarized component 2b into which the passing light is split by the second polarizing beam splitter 9. Furthermore, the second light receiving element 10b can measure the amount of light of the second linearly polarized component 2c into which the passing light is split by the second polarizing beam splitter 9. The first light receiving element 10a and the second light receiving element 10b are, for example, photo diodes.

The calculating unit 12 receives input measurement signals output by the respective light receiving elements 10a and 10b and which are indicative of light amounts. Then, the calculating unit 12 determines the amount of deflection in one of the two directions (the X axis direction in the first exemplary embodiment) based on the amount of light measured by the first light receiving element 10a. Furthermore, the calculating unit 12 determines the amount of deflection in the other of the two directions (the Z axis direction in the first exemplary embodiment) based on the amount of light measured by the second light receiving element 10b.

A detecting operation by the laser light deflection amount detecting apparatus 100 will be described below in detail. The laser light 2a emitted by the laser light source 1 in the Y axis direction has its optical axis deflected in the X axis direction and (or) the Z axis direction within the range of stability of the laser light source 1. As illustrated in FIG. 2, the laser light 2a is split by the polarizing beam splitter 4 into the first linearly polarized component 2b, which is s polarization, and the second linearly polarized component 2c, which is p polarization.

First, a case in which the optical axis of the laser light 2a is deflected in the X axis direction will be described. The first linearly polarized component 2b is reflected in the X axis direction by the polarizing beam splitter 4 and thus deflected in the Y axis direction. On the other hand, the second linearly polarized component 2c deflected in the X axis direction passes through the ½λ plate 5 and is then reflected by the mirrors 6a, 6b, and 6c. Then, the second linearly polarized component 2c is reflected by the mirror 6d and deflected in the Z axis direction, reflected by the mirror 6e and deflected in the X axis direction, and reflected by the mirror 6f and deflected in the Z axis direction. Thereafter, the laser light 2c passes through the polarizing beam splitter 4 again. After passing through the polarizing beam splitter 4, the laser light 2c overlaps the laser light 2b. The combined light travels in a straight line in the X axis direction.

Thus, the deflection of the optical axis of the laser light 2a deflected in the X axis direction corresponds to the deflection of the optical axis of the laser light 2b deflected in the Y axis direction and to the deflection of the optical axis of the laser light 2c deflected in the Z axis direction. Thus, the laser light 2b and the laser light 2c, into which the laser light 2a with the same single optical axis deflection direction is split upon passing through the optical system 3 and the polarizing beam splitter 4, have the respective optical axis deflection directions that are different from each other by 90 degrees in angle.

Now, a case in which the laser light 2a is deflected in the Z axis direction will be described. The first linearly polarized component 2b remaining deflected in the Z axis direction is reflected by the polarizing beam splitter 4. On the other hand, the second linearly polarized component 2c deflected in the Z axis direction passes through the ½λ plate 5 and is then reflected by the mirror 6a and deflected in the Y axis direction, reflected by the mirror 6b and deflected in the Z axis direction, and reflected by the mirror 6c and deflected in the Y axis direction. Then, the second linearly polarized component 2c remaining deflected in the Y axis direction is reflected by the mirrors 6d, 6e, and 6f and then passes through the polarizing beam splitter 4 again. After passing through the polarizing beam splitter 4, the laser light 2c overlaps the laser light 2b. The combined light travels in a straight line in the X axis direction.

Thus, the deflection of the optical axis of the laser light 2a deflected to the Z axis direction corresponds to the deflection of the optical axis of the laser light 2b deflected in the Z axis direction and to the deflection of the optical axis of the laser light 2c deflected in the Y axis direction. Thus, the laser light 2b and the laser light 2c, into which the laser light 2a with the same single optical axis deflection direction is split upon passing through the optical system 3 and the polarizing beam splitter 4, have the respective optical axis deflection directions that are different from each other by 90 degrees in angle.

In this case, if the laser light 2a is prevented from being deflected, the optical axis of the first linearly polarized component (laser light) 2b having passed through the polarizing beam splitter 4 coincides with the optical axis of the second linearly polarized component (laser light) 2c as illustrated in FIG. 3A. The light blocking member 8 blocks a half of each of the laser light 2b and the laser light 2c in the Y axis direction.

Then, if the laser light 2a is deflected in the X axis direction, the optical axis of the first linearly polarized component 2b is deflected in the Y axis direction, and the optical axis of the second linearly polarized component 2c is deflected in the Z axis direction, as shown in FIG. 3B. Thus, whereas the amount of light of the second linearly polarized component 2c having passed the light blocking member 8 remains the same as that obtained when the laser light 2a is prevented from being deflected, the amount of light of the first linearly polarized component 2b having passed the light blocking member 8 varies depending on the amount of deflection of the laser light 2a. Specifically, if the laser light 2a is deflected to the +X axis direction (−X axis direction), the second linearly polarized component 2c delivered to the light blocking member 8 is deflected to the +Z axis direction (−Z axis direction), and the amount of light of the second linearly polarized component 2c passing the light blocking member 8 remains unchanged. On the other hand, if the laser light 2a is deflected to the +X axis direction, the first linearly polarized component 2b delivered to the light blocking member 8 is deflected to the −Y axis direction, and the amount of light of the second linearly polarized component 2c passing the light blocking member 8 decreases depending on the amount of deflection of the laser light 2a. In contrast, if the laser light 2a is deflected to the −X axis direction, the second linearly polarized component 2c delivered to the light blocking member 8 is deflected to the +Y axis direction, and the amount of light of the second linearly polarized component 2c passing the light blocking member 8 increases depending on the amount of deflection of the laser light 2a.

Furthermore, if the laser light 2a is deflected in the Z axis direction, the optical axis of the first linearly polarized component 2b is deflected in the Z axis direction, and the optical axis of the second linearly polarized component 2c is deflected in the Y axis direction, as shown in FIG. 3C. Thus, whereas the amount of light of the first linearly polarized component 2b having passed the light blocking member 8 remains the same as that obtained when the laser light 2a is prevented from being deflected, the amount of light of the second linearly polarized component 2c having passed the light blocking member 8 varies depending on the amount of deflection of the laser light 2a. Specifically, if the laser light 2a is deflected to the +Z axis direction (−Z axis direction), the first linearly polarized component 2b delivered to the light blocking member 8 is deflected to the +Z axis direction (−Z axis direction), and the amount of light of the first linearly polarized component 2b passing the light blocking member 8 remains unchanged. On the other hand, if the laser light 2a is deflected to the +Z axis direction, the second linearly polarized component 2c delivered to the light blocking member 8 is deflected to the +Y axis direction, and the amount of light of the second linearly polarized component 2c passing the light blocking member 8 increases depending on the amount of deflection of the laser light 2a. In contrast, if the laser light 2a is deflected to the −Z axis direction, the second linearly polarized component 2c delivered to the light blocking member 8 is deflected to the −Y axis direction, and the amount of light of the second linearly polarized component 2c passing the light blocking member 8 decreases depending on the amount of deflection of the laser light 2a.

The passing light (laser light 2b and the laser light 2c) having passed the light blocking member 8 without being blocked by the light blocking member 8 is split by the second polarizing beam splitter 9 into the first linearly polarized component 2b received by the first light receiving element 10a and the second linearly polarized component 2c received by the second light receiving element 10b. Since the light blocking member 8 blocks light in the Y axis direction, the light receiving elements 10a and 10b are not sensitive to the deflection of the optical axis in the Z axis direction, and the amount of light blocked varies depending only on the deflection of the optical axis in the Y axis direction. That is, on the assumption that the amount of light of the laser light 2a remains unchanged, the amount of light of the first linearly polarized component 2b received by the first light receiving element 10a increases and decreases depending only on the deflection of the laser light 2a in the X axis direction. In contrast, the amount of light of the second linearly polarized component 2c received by the second light receiving element 10b increases and decreases depending only on the deflection of the laser light 2a in the Z axis direction. Thus, the calculating unit 12 can determine the deflection of the laser light 2a in the X axis direction based on the amount of light of the first linearly polarized component 2b and determine the deflection of the laser light 2a in the Z axis direction based on the amount of light of the second linearly polarized component 2c.

Specifically, the amount of light of the first linearly polarized component 2b measured by the first light receiving element 10a with the laser light 2a prevented from being deflected is pre-stored in the storing unit 13 as a first light amount reference value. Furthermore, the amount of light of the second linearly polarized component 2c measured by the second light receiving element 10b with the laser light 2a prevented from being deflected is pre-stored in the storing unit 13 as a second light amount reference value. The calculating unit 12 calculates the amount of misalignment of the laser light 2a in the X axis direction based on the deviation between the amount of light actually measured by the first light receiving element 10a and the first light amount reference value stored in the storing unit 13. Furthermore, the calculating unit 12 calculates the amount of misalignment of the laser light 2a in the Z axis direction based on the deviation between the amount of light actually measured by the second light receiving element 10b and the second light amount reference value stored in the storing unit 13. If the first light amount reference value is the same as (or substantially the same as) the second light amount reference value, one light amount reference value may be stored in the storing unit 13 so that the calculating unit 12 can determine the amount of misalignment based on the deviation between the result of measurement of the amount of light and the light amount reference value.

Thus, the calculating unit 12 determines the amount of misalignment of the laser light 2a in the X axis direction based on a change in the amount of light measured by the first light receiving element 10a and determines the amount of misalignment of the laser light 2a in the Z axis direction based on a change in the amount of light measured by the second light receiving element 10b.

As described above, according to the first exemplary embodiment, the amount of light of the first linearly polarized component 2b resulting from the splitting by the second polarizing beam splitter 9 varies depending on the deflection of the optical axis in one of the two orthogonal directions (X axis direction). Furthermore, the amount of light of the second linearly polarized component 2c resulting from the splitting by the second polarizing beam splitter 9 varies depending on the deflection of the optical axis in the other of the two orthogonal directions (Z axis direction). Thus, the amounts of deflection of the laser light 2a in the two directions (X and Z axis directions) can be determined based on the results of measurement by the separate light receiving elements 10a and 10b. Therefore, the amounts of deflection of the laser light 2a in the two directions can be accurately measured.

Moreover, in the first exemplary embodiment, each of the laser light 2b and the laser light 2c is focused on the position of the light blocking member 8 by the focusing lens 7a. At the focusing position, each of the laser light 2b and the laser light 2c has a reduced laser diameter, increasing the rate of a change in the amount of light blocked by the light blocking member 8 as a result of the deflection of the optical axis. Thus, this enables an increase in the resolution of measurement of the deflection of the optical axis in the two directions of the laser light 2a, that is, the X axis direction and the Z axis direction and thus in the accuracy of the measurement.

Furthermore, in the first exemplary embodiment, as illustrated in FIG. 3A, the light blocking member 8 is arranged so as to block a half of the combined light (laser light 2b and laser light 2c) while the laser light 2a emitted by the laser light source 1 is prevented from being deflected. That is, each of the laser light 2b and the laser light 2c has a generally circular cross section, and thus the light blocking member 8 blocks a half of the circle of each of the (circular) laser light 2b and the (circular) laser light 2c. The thus arranged light blocking member 8 maximizes the amount of change in the amount of light of each of the laser light 2b and the laser light 2c due to the deflection of the laser light 2a, thus increasing the resolution. Therefore, the accuracy of measurement of the amount of misalignment is improved.

In the description of the first exemplary embodiment, the deflection direction of the optical axis is rotated through 90 degrees between the laser light 2b and the laser light 2c. However, the present exemplary embodiment can be achieved with a value of about 90 degrees. However, the deflection of the optical axis can be more accurately measured as the difference in angle is closer to 90 degrees.

Furthermore, in the description of the first exemplary embodiment, the optical system 3 includes the six mirrors 6a to 6f and the ½λ plate 5. However, the optical system is not limited to this configuration. Reflecting members such as prisms can be used instead of the mirrors. Additionally, the number and arrangement of reflecting members are not limited to those in the first exemplary embodiment. Any plural number of reflecting members may be used which can rotate the deflection direction of linearly polarized light through 90 degrees.

In addition, in the description of the first exemplary embodiment, the ½λ plate is used as a polarizing unit. However, the polarizing unit is not limited to this configuration. Two quarter-wavelength plates (¼λ plates) may be combined together.

Furthermore, in the description of the first exemplary embodiment, the optical system 3 is configured to rotate the deflection direction of the second linearly polarized component 2c around the optical axis. However, the optical system is not limited to this configuration. The optical system may be configured to rotate the first linearly polarized component 2b or both linearly polarized components 2b and 2c. That is, the first linearly polarized component and second linearly polarized component contained in the combined light may differ by 90 degrees in the deflection direction and by 90 degrees in the polarization direction.

Additionally, in the description of the first exemplary embodiment, the combined light is blocked in the Y axis direction by the light blocking member 8. However, the combined light may be blocked in the Z axis direction by the light blocking member 8. In this case, the amount of light of the first linearly polarized component 2b resulting from the splitting by the second polarizing beam splitter 9 varies depending on the deflection of the optical axis in one of the two orthogonal directions (Z axis direction). Furthermore, the amount of light of the second linearly polarized component 2c resulting from the splitting by the second polarizing beam splitter 9 varies depending on the deflection of the optical axis in the other of the two orthogonal directions (Y axis direction). Thus, also in this case, the amounts of deflection of the laser light in the two directions can be determined based on the results of measurement by the separate light receiving elements 10a and 10b. Therefore, the amounts of deflection of the laser light 2a in the two directions can be accurately measured.

Additionally, the focusing lenses 7a and 7b allow the amount of deflection of the laser light 2a to be more accurately measured. However, if the accuracy need not be further improved, the focusing lenses 7a and 7b may be omitted.

In addition, the light blocking member 8 may be arranged at the position where the half of the combined light (laser light 2b and laser light 2c) is blocked. However, the present invention is not limited to the half of the combined light. The amount of deflection can be measured provided that part of the combined light is blocked.

[Second Exemplary Embodiment]

Figure 4:
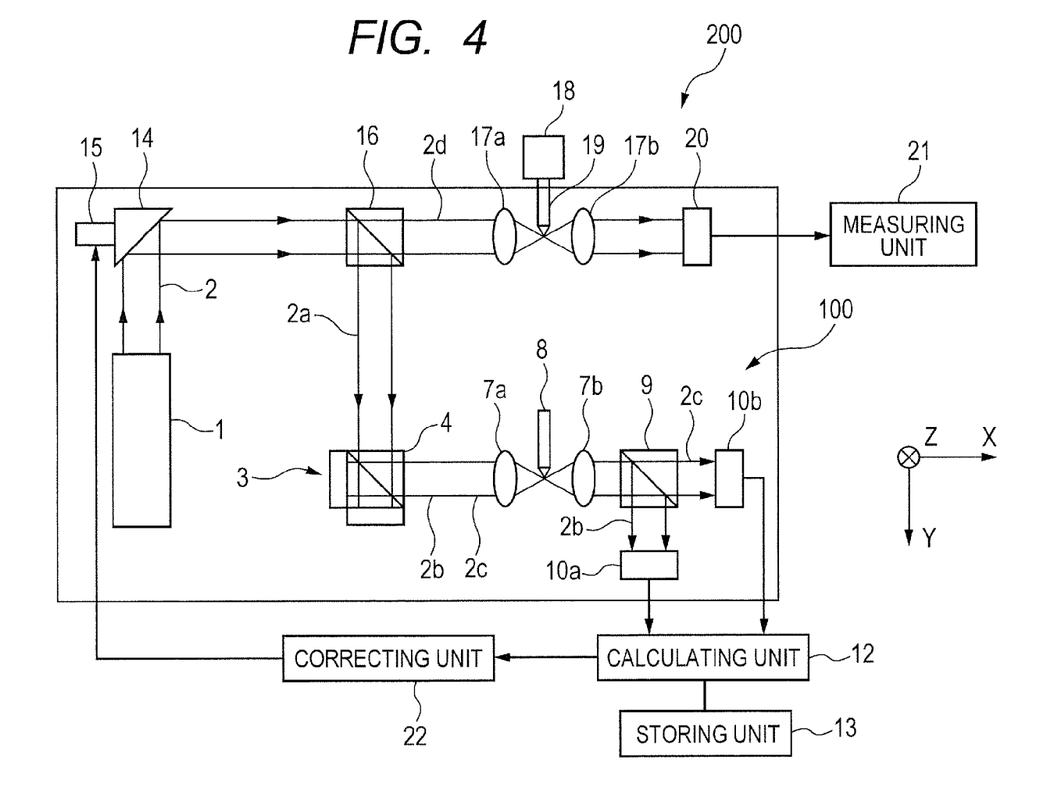
FIG. 4 is a diagram illustrating a general configuration of a displacement measuring apparatus according to a second exemplary embodiment of the present invention.

Now, a displacement measuring apparatus according to a second exemplary embodiment of the present invention will be described. FIG. 4 is a diagram illustrating a general configuration of the displacement measuring apparatus according to the second exemplary embodiment of the present invention. Components of a displacement measuring apparatus 200 according to the second embodiment illustrated in FIG. 4 which components are similar to those in the first exemplary embodiment are denoted by the same reference numerals and will not be described in detail.

The displacement measuring apparatus 200 measures the position and shape of the measurement target 19 that blocks laser light 2d based on the amount of passing laser light. The displacement measuring apparatus 200 is applied to, for example, measurement of the positions and shapes of tools in a machine tool.

The displacement measuring apparatus 200 includes a laser light deflection amount detecting apparatus 100 similar to that in the first exemplary embodiment, a laser light source 1, a correcting mirror 14 serving as a reflecting member, a driving source 15, a beam splitter 16, focusing lens 17a and 17b, and a moving shaft 18 that drives the measurement target 19. Furthermore, the displacement measuring apparatus 200 includes a third light receiving element 20, a measuring unit 21, and a correcting unit 22.

The laser light source 1 emits laser light 2 in the −Y axis direction. The correcting mirror 14 serving as a reflecting member (correcting reflecting member) is arranged between the laser light source 1 and the measurement target 19 to correct deflection of the laser light 2 emitted by the laser light source 1. The correcting mirror 14 reflects the laser light 2 in the +X axis direction while correcting the optical axis of the laser light 2. Any reflecting member such as a prism may be used instead of the correcting mirror 14. The driving source 15 drives the correcting mirror 14. According to the second exemplary embodiment, the driving source 15 is a rotational double-axis driving source that can drive the correcting mirror 14 around the Y and Z axes.

The beam splitter 16 is arranged downstream of the correcting mirror 14. The beam splitter 16 splits the laser light 2 reflected by the correcting mirror 14 into laser light 2a traveling in the +Y axis direction and laser light 2d traveling in the +X axis direction. The beam splitter 16 is, for example, a half mirror. As described above in the first exemplary embodiment, the laser light 2a is incident on a polarizing beam splitter 4 of the laser light deflection amount detecting apparatus 100.

The focusing lens 17a focuses the laser light 2d on the position of the measurement target 19. The moving shaft 18 enables the measurement target 19 to be moved in the Y and Z axis directions. The focusing lens 17b converts the laser light 2d into parallel light again. The third light receiving element 20 receives the laser light (passing light) 2d having passed the measurement target 19 without being blocked by the target 19 to measure the amount of light of the laser light 2d.

The measuring unit 21 measures displacement of the measurement target 19 based on a change in output from the third light receiving element 20.

The correcting unit 22 operates the driving source 15 so as to compensate for the amount of deflection of the laser light 2a in the two directions (X axis direction and Z axis direction) calculated by the calculating unit 12 of the laser light deflection amount detecting apparatus 100. That is, the correcting unit 22 allows the driving source 15 to drive the correcting mirror in a direction in which the amount of deflection detected by the laser light deflection amount detecting apparatus 100 is reduced to zero.

Now, a displacement measuring operation performed by the displacement measuring apparatus 200 will be described. The displacement measuring apparatus 200 determines, by measurement, a position where the measurement target 19 blocks the laser light 2d by any amount (the relative position between the laser light 2d and the measurement target 19). Like the laser light 2 and the laser light 2a, the laser light 2d has its optical axis deflected within the range of stability of the laser light source 1, leading to a displacement measurement error. Thus, the laser light deflection amount detecting apparatus 100 detects the amount of deflection of the optical axis of the laser light 2a to correct the deflection of the laser light 2 by the correcting mirror 14.

In this case, the deflection of the optical axis of the laser light 2a is measured as described above in the first exemplary embodiment. The calculating unit 12 calculates the amount of deflection of the optical axis of the laser light 2a based on the measured values of the amount of light from light receiving elements 10a and 10b. The correcting unit 22 instructs the driving source 15 to drive the correcting mirror 14 so as to stabilize the deflection of the optical axis. This enables a reduction in the adverse effect of deflection of the optical axis of the laser light from the laser light source 1. Hence, since the adverse effect of deflection of the optical axis of the laser light from the laser light source 1 is reduced, the deflection of the optical axis of the laser light 2d is also reduced, allowing displacement to be accurately measured.

As described above, the displacement measuring apparatus 200 according to the second exemplary embodiment can accurately measure the displacement of the measurement target 19 by reducing the adverse effect of deflection of the optical axis of laser light from the laser light source 1.

Moreover, the laser light is focused on the positions of the light blocking member 8 and the measurement target 19. Each of the laser light 2a and the laser light 2d has a reduced laser diameter at the focusing position, increasing the rate of a change in the amount of light when the laser light is blocked by the light blocking member 8 or the measurement target 19 as a result of deflection of the optical axis. Thus, more accurate measurement can be achieved by increasing the measurement resolution for the deflection of the optical axis of the laser light 2a in the two directions, that is, the X and Z axis directions and the measurement resolution for the displacement of the measurement target.

In a specific application, the displacement measuring apparatus 200 can be used as a shape measuring apparatus that measures the shape of the measurement target 19. The measurement target 19 to be measured may be a cutting tool 23 illustrated in FIG. 5. The cutting tool 23 includes a diamond turning tool 25 fixed to a shank 24 and is configured such that a processing target is cut by a cutting edge 26 of the diamond turning tool 25. In this case, with processing methods other than single-point processing, the shape of the cutting edge ridge 26 affects the result of processing. Thus, the cutting edge 26 with a low form accuracy reduces the form accuracy of the processing target. However, the diamond turning tool 25 is a processing resistant material, and accurately processing the cutting edge 26 is difficult. Hence, accurate processing can be achieved by measuring the shape of the cutting edge 26 by the present method and correcting an error in the shape of the cutting edge ridge 26 using a processing program.

Figure 5:
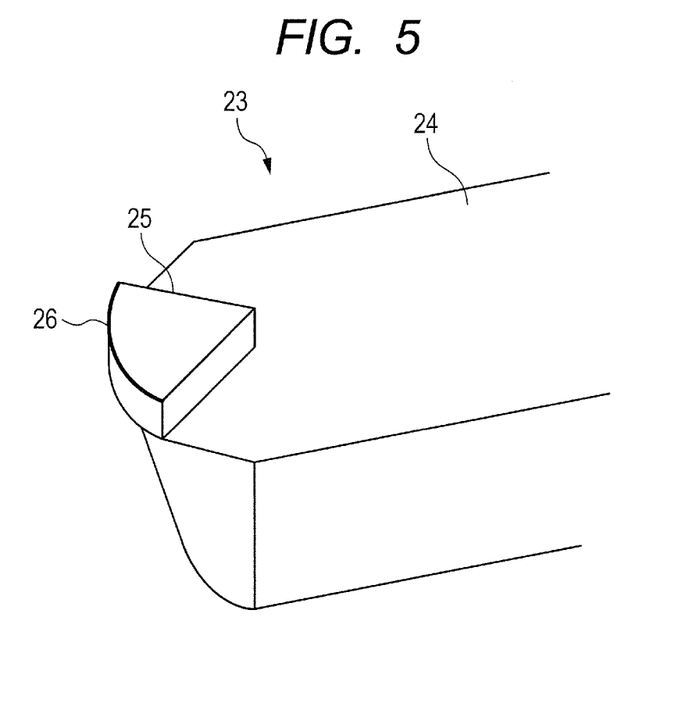
FIG. 5 is a perspective view illustrating a cutting tool that is a measurement target of the displacement measuring apparatus according to the second exemplary embodiment of the present invention.

According to this measuring method, the moving shaft 18 is operated under the control of the measuring unit 21 to allow the cutting edge 26 of the cutting tool 23 corresponding to the measurement target 19 to be scanned so that the amount of laser light 2d blocked by the cutting edge 26 corresponding to the measurement target 19 is maintained constant. That is, the measuring unit 21 moves the cutting tool 23 (moving shaft 18) with an output (the amount of passing light) from the third light receiving element 20 maintained constant to allow the laser light 2d to scan along the cutting edge 26 with the amount of laser light 2d blocked by the cutting edge 26 maintained constant. The history of movement of the moving shaft 18 (that is, the cutting edge 26) corresponds to the shape of the cutting edge 26. Thus, the shape of the cutting edge 26 is measured by the measuring unit 21. Another measuring method uses the moving shaft 18 to scan along the design shape of the cutting edge 26 of the cutting tool 23 corresponding to the measurement target 19, thus measuring a difference from the design shape based on a change in the amount of light blocked (the amount of passing light). As described above, the measuring unit 21 measures the shape of the cutting edge 26 based on the result of movement of the cutting edge 26 with reference to the output from the third light receiving element 20.

The calculating unit 12, the measuring unit 21, and the correcting unit 22 may be formed of different control apparatuses or a single control apparatus providing the functions of the respective units. Furthermore, in the present exemplary embodiment, the deflection direction of the optical axis is rotated through 90 degrees between the laser light 2b and the laser light 2c. However, the present exemplary embodiment can be achieved with a value of about 90 degrees. However, the deflection of the optical axis can be more accurately measured as the difference in angle is closer to 90 degrees.

Figure 6:
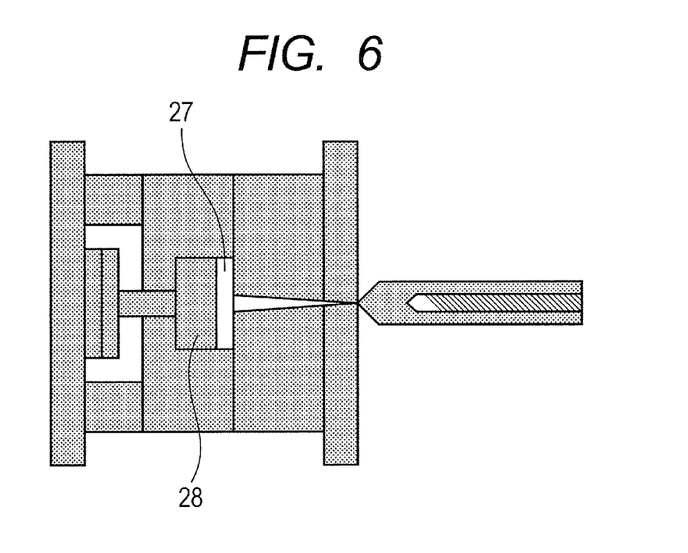
FIG. 6 is a schematic diagram illustrating an example of a mold for molding an optical element.

The thus determined shape of the cutting edge can be used for machining and the like which require high form accuracy. The machine tool subjected to the accurate measurement can be used, for example, to manufacture a mold for molding an optical element such as a plastic lens or a glass lens. FIG. 6 is a schematic diagram of an example of the mold for molding an optical element. In FIG. 6, a screw is rotated to inject a molten resin into a cavity 27. A die member is shown at 28. The surface of the die member is processed to have a shape allowing the optical performance of an optical element to be demonstrated, for example, a curved surface shape, an aspherical shape, or a lattice shape. A resin is injected into a space (cavity) formed by the die member 28, a movable die set, and fixed die set. The shape processed on the surface of the die member is transferred to the resin to form an optical element. The die member 28 is, for example, inserted and fitted into a void (pocket) in the movable die set to form a space (cavity) between the movable die set and the fixed die set. The die member is processed by the processing program created based on the shape of the cutting edge of the cutting tool measured by the displacement measuring apparatus according to the present invention. The processing program allows the die member 28 to be machined by moving the cutting edge of the cutting tool and the die member, relative to each other. A processing program for forming the desired shape by moving the cutting edge of the cutting tool and the die member corresponding to the measurement target, relative to each other is conventionally created by defining each of the position of the cutting edge of the cutting tool and the position of the processing target. The position of the cutting edge of the cutting tool is defined, for example, by the design shape of the cutting edge of the cutting tool. If the shape of the cutting edge of the cutting tool for actual processing is different from the designed shape, the error in the shape of the cutting edge results in a processing error to affect the accuracy of processing of the processing target. Thus, data on the shape of the cutting edge determined by the displacement measuring apparatus according to the present exemplary embodiment is used to create a processing program. This enables a significant reduction in the adverse effect, on the processing of the mold, of an error in the shape of the cutting edge, thus allowing the mold to be more accurately processed. As a result, the form accuracy for an optical element molded using this mold can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-159246, filed Jul. 20, 2011, which is hereby incorporated by reference herein in its entirety.

What is claimed is:

1. A laser light deflection amount detecting apparatus that detects an amount of deflection of laser light emitted by a laser light source, in two directions orthogonal to each other and also orthogonal to an optical axis of the laser light, the laser light deflection amount detecting apparatus comprising:
   the laser light source;
   a first polarizing beam splitter that splits the laser light emitted by the laser light source into a first linearly polarized component and a second linearly polarized component having a polarization direction orthogonal to a polarization direction of the first linearly polarized component;
   an optical system that rotates at least one of the first linearly polarized component and the second linearly polarized component around an optical axis in such a manner that a deflection direction of the first linearly polarized component is orthogonal to a deflection direction of the second linearly polarized component, and that acquires a combined light of the first linearly polarized component and the second linearly polarized component, at least one of which is rotated;
   a light blocking member including a tip arranged to block a part of the combined light acquired by the optical system;
   a second polarizing beam splitter that splits passing light, having passed the light blocking member without being blocked by the light blocking member, into a third linearly polarized component and a fourth linearly polarized component;
   a first light receiving element that measures an amount of light of the third linearly polarized component resulting from the splitting by the second polarizing beam splitter; and
   a second light receiving element that measures an amount of light of the fourth linearly polarized component resulting from the splitting by the second polarizing beam splitter,
   wherein the light blocking member is arranged between the optical system and the second polarizing beam splitter.

2. The laser light deflection amount detecting apparatus according to claim 1, further comprising a focusing lens that focuses the combined light on a position of the light blocking member.

3. The laser light deflection amount detecting apparatus according to claim 1, wherein the light blocking member is arranged at a position where the light blocking member blocks a half of the combined light while the laser light emitted by the laser light source is prevented from being deflected.

4. A displacement measuring apparatus comprising:
- a reflecting member arranged between the laser light source and a measurement target to correct deflection of the laser light emitted by the laser light source;
- a driving source that drives the reflecting member;
- a third light receiving element that receives the laser light reflected by the reflecting member and having passed the measurement target without being blocked by the measurement target;
- a measuring unit that measures displacement of the measurement target based on a change in an output from the third light receiving element;
- the laser light deflection amount detecting apparatus according to claim 1; and
- a correcting unit that operates the driving source so as to compensate for the amount of deflection obtained by the laser light deflection amount detecting apparatus.

5. The laser light deflection amount detecting apparatus according to claim 1, further comprising a calculating unit that determines an amount of deflection in one of the two directions based on the amount of light measured by the first light receiving element, while determining an amount of deflection in the other of the two directions based on the amount of light measured by the second light receiving element.

6. The laser light deflection amount detecting apparatus according to claim 1, wherein the tip is formed to extend in a direction parallel to the deflection direction of one of the two linearly polarized components that are contained in the combined light acquired by the optical system and have the respective orthogonal deflection directions.

* * * * *